US012776594B2

(12) United States Patent
Ould-Mohamed et al.

(10) Patent No.: US 12,776,594 B2
(45) Date of Patent: Oct. 27, 2026

(54) ANTENNA SYSTEM WITH LOW-PASS FILTER

(71) Applicant: Telefonaktiebolaget LM Ericsson (publ), Stockholm (SE)

(72) Inventors: Taleb Ahmed Ould-Mohamed, Moers (DE); Philipp Karl Gentner, Vienna (AT); Philipp Ponn, Kolbermoor (DE); Tanja Hefele, Waakirchen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 35 days.

(21) Appl. No.: 18/838,432

(22) PCT Filed: Feb. 15, 2022

(86) PCT No.: PCT/EP2022/053623
§ 371 (c)(1),
(2) Date: Aug. 14, 2024

(87) PCT Pub. No.: WO2023/155971
PCT Pub. Date: Aug. 24, 2023

(65) Prior Publication Data

US 2025/0167461 A1 May 22, 2025

(51) Int. Cl.
*H01Q 21/30* (2006.01)
*H01Q 1/52* (2006.01)
(Continued)

(52) U.S. Cl.
CPC .............. *H01Q 21/30* (2013.01); *H01Q 1/523* (2013.01); *H01Q 9/045* (2013.01); *H01Q 19/108* (2013.01); *H01Q 21/26* (2013.01)

(58) Field of Classification Search
CPC .......... H01Q 1/52; H01Q 1/246; H01Q 21/26; H01Q 19/108; H01Q 21/30; H01Q 1/523; H01Q 9/045
See application file for complete search history.

(56) References Cited

U.S. PATENT DOCUMENTS 8,830,135 B2 * 9/2014 Dean ...................... H01Q 21/26
343/700 MS
9,276,329 B2 3/2016 Jones et al.
(Continued)

FOREIGN PATENT DOCUMENTS

CN 112151951 A 12/2020
CN 112768929 A 5/2021
(Continued)

OTHER PUBLICATIONS

Zhang, et al., "A Wideband Dual-Polarized Antenna Using Planar Quasi-Open-Sleeve Dipoles for Base Station Applications," International Journal of Antennas and Propagation, 2015, Hindawi Publishing Corporation, 8 pages.
(Continued)

*Primary Examiner* — Graham P Smith
(74) *Attorney, Agent, or Firm* — Withrow & Terranova, PLLC

(57) ABSTRACT

We generally describe an antenna system comprising a dual-polarized radiating element extending generally in a first direction parallel or substantially parallel to a reflector of the antenna system. The dual-polarized radiating element is configured to emit an electromagnetic wave. The antenna system further comprises a low-pass filter structure extending generally in a second direction perpendicular or substantially perpendicular to the reflector of the antenna system. The low-pass filter structure is spaced apart, in relation to the first direction, from a center portion of the dual-polarized radiating element. The antenna system further comprises a coupling feeding line which electrically couples, via a region which comprises an end portion of the dual-polarized radiating element, the low-pass filter structure with the center portion of the dual-polarized radiating element for feeding an electrical signal via the low-pass
(Continued)

filter structure through the coupling feeding line to the center portion of the dual-polarized radiating element.

18 Claims, 16 Drawing Sheets

(51) Int. Cl.

| | |
|---|---|
| ***H01Q 9/04*** | (2006.01) |
| ***H01Q 19/10*** | (2006.01) |
| ***H01Q 21/26*** | (2006.01) |

(56) References Cited

U.S. PATENT DOCUMENTS 9,819,084 B2 11/2017 Zimmerman et al.
2003/0143972 A1* 7/2003 Satoh .................. H03H 7/1766 455/334
2003/0231138 A1* 12/2003 Weinstein ................ H01Q 5/49 343/810
2013/0214982 A1 8/2013 Dean et al.
2024/0088566 A1* 3/2024 Somersalo ............ H01Q 1/288

FOREIGN PATENT DOCUMENTS

CN 113036432 A 6/2021
CN 113381184 A * 9/2021 ............ H01Q 21/28
DE 102015007503 A1 * 12/2016 ............ H01Q 9/285

OTHER PUBLICATIONS

International Search Report and Written Opinion for International Patent Application No. PCT/EP2022/053623, mailed Oct. 4, 2022, 11 pages.

* cited by examiner

ANTENNA SYSTEM WITH LOW-PASS FILTER

This application is a 35 U.S.C. § 371 national phase filing of International Application No. PCT/EP2022/053623, filed Feb. 15, 2022, the disclosure of which is incorporated herein by reference in its entirety.

TECHNICAL FIELD

This invention generally relates to an antenna system in which a coupling feeding line electrically couples a low-pass filter with a center portion of a dual-polarized radiating element, wherein the coupling feeding line extends at least partially on a first substrate side along a region which comprises, on a second substrate side, an end portion of the dual-polarized radiating element.

BACKGROUND

Base station antennas according to the state of the art are provided as multiband array antennas. Different antenna elements may hereby be arranged in a multitude of band-individual array columns. Different bands in which multi-band antenna arrays according to the state of the art typically operate are low-band (600 MHZ-960 MHz), mid-band (1400 MHZ-2700 MHZ) and high-band (3200 MHZ-4200 MHZ).

High-band and low-band antenna elements may be provided in which an interleaving design is realized with a central feeding structure of the cross-dipole low-band antenna elements. The position of the low-band antenna elements is adjusted to the position of the high-band antenna elements, such that an adjustment of the vertical concepts to each other is required.

FIGS. 1*a* and 1*b* show top views of schematic illustrations of multiband systems according to the state of the art.

In FIG. 1*a*, the multiband array antenna 100 comprises low-band antenna elements 102 and high-band antenna elements 104. In this example, the low-band antenna elements 102 and high-band antenna elements 104 are arranged in an interleaving manner.

In FIG. 1*b*, the multiband array antenna 150 also comprises low-band antenna elements 152 and high-band antenna elements 154, whereby the interleaving arrangement of the low-band and high-band antenna elements 152 and 154 is implemented by some of the high-band antenna elements 154 being surrounded by parts of low-band antenna elements 152.

Interleaving designs according to the state of the art are based on a central feeding structure for the antenna elements or a split version in which the cross-polarized low-band antenna elements and the high-band antenna elements cannot be collocated. A drawback according to the interleaving concept of the multiband systems of the state of the art is that the position of the low-band antenna elements needs to be adjusted to the underlying high-band antenna elements. It may be necessary to adjust the position of the antenna elements in order to maintain performance of the individual array.

Prior art can be found, for example, in: Guan-xi Zhang et al., "A Wideband Dual-Polarized Antenna Using Planar Quasi-Open-Sleeve Dipoles for Base Station Applications", International Journal of Antennas and Propagation, Volume 2015, Article ID 164392, 7 pages; in U.S. Pat. No. 9,276,329 B2, which generally relates to an ultra-wideband dual-band cellular base station antenna; and in U.S. Pat. No. 9,819,084 B2, which generally relates to a method of eliminating resonances in multiband radiating arrays.

SUMMARY

The inventors have realized that the feeding structure of the low-band antenna element results in performance degradation of the (underlying) high-band antenna elements and their radiation pattern. The adjustment of the position of the low-band antenna elements with respect to the position of the high-band antenna elements may also result in insufficient use of the low-band antenna element volume due to planar geometries of cross-dipole arms, thereby resulting in a limited low-band radiator bandwidth. There is therefore a need for improved antenna systems.

According to the present disclosure, there is provided an antenna system comprising a dual-polarized radiating element extending generally in a first direction parallel or substantially parallel to a reflector of the antenna system. The dual-polarized radiating element is configured to emit an electromagnetic wave. The antenna system further comprises a low-pass filter structure extending generally in a second direction perpendicular or substantially perpendicular to the reflector of the antenna system. The low-pass filter structure is spaced apart, in relation to the first direction, from a center portion of the dual-polarized radiating element. The antenna system further comprises a coupling feeding line which electrically couples, via a region which comprises an end portion of the dual-polarized radiating element, the low-pass filter structure with the center portion of the dual-polarized radiating element for feeding an electrical signal via the low-pass filter structure through the coupling feeding line to the center portion of the dual-polarized radiating element.

In some examples, the low-pass filter structure may be arranged on a printed circuit board (PCB) (or generally substrate) and the low-pass filter structure, which may be provided in some examples as a combination of one or more inductance elements and one or more capacitance elements, may extend along a direction along the printed circuit board (or generally substrate).

In some examples, the low-pass filter structure is spaced apart, in relation to the first direction, from the dual-polarized radiating element.

In some examples, the coupling feeding line electrically connects the low-pass filter structure with the center portion of the dual-polarized radiating element.

In some examples, the low-pass filter structure comprises or is coupled to a first strip conductor and a second strip conductor. The first strip conductor couples a feeding port of the antenna system with the dual-polarized radiating element. The second strip conductor is coupled to the coupling feeding line.

In some examples, the antenna system further comprises a dielectric substrate extending generally parallel or substantially parallel to the reflector of the antenna system. The dual-polarized radiating element is arranged at least partially on a first side of the dielectric substrate. The coupling feeding line is arranged at least partially on a second side of the dielectric substrate. The first side is opposite to the second side. The first side faces away from the reflector of the antenna system, and the second side faces towards the reflector of the antenna system.

In some examples, the coupling feeding line extends at least from an end portion of the dielectric substrate to the center portion of the dual-polarized radiating element.

In some examples, the coupling feeding line extends from the end portion of the dielectric substrate beyond the center portion of the dual-polarized radiating element.

In some examples, the coupling feeding line at least partially extends parallel or substantially parallel to the first direction.

In some examples, a coupling between the coupling feeding line and the center portion of the dual-polarized radiating element is capacitive or galvanic. In some examples, the dual-polarized radiating element comprises a feeding point at the center portion. For a galvanic coupling, a plurality of parallel lines or areas may be required.

In some examples, the low-pass filter structure comprises a stepped-impedance low-pass filter structure.

In some examples, the low-pass filter structure comprises a corrugated structure.

In some examples, the low-pass filter structure is arranged at an end portion of the dual-polarized radiating element.

In some examples, the antenna system further comprises one or more chokes provided in the dual-polarized radiating element.

In some examples, the radiating element comprises one or more loop dipole arms.

In some examples, the antenna system further comprises one or more conductive parasitic elements electrically disconnected from the coupling feeding line.

In some examples, the coupling feeding line comprises a corrugated structure.

In some examples, the dual-polarized radiating element comprises a dual-polarized cross dipole comprising two dipole arms which are arranged orthogonal with respect to each other. The two dipole arms extend generally in a plane parallel or substantially parallel to the reflector of the antenna system. The antenna system comprises two said low-pass filter structures. A first one of the low-pass filter structures is electrically coupled with the center portion of the dual-polarized cross dipole via a first coupling feeding line for feeding a first electrical signal to a first one of the dipole arms. A second one of the low-pass filter structures is electrically coupled with the center portion of the dual-polarized cross dipole via a second coupling feeding line for feeding a second electrical signal to a second one of the dipole arms.

In some examples, the first low-pass filter structure is arranged at an end portion of the first dipole arm. The second low-pass filter structure is arranged at an end portion of the second dipole arm.

In some examples, the first feeding line and the second feeding line are arranged at least partially on the second side of the dielectric substrate. The first coupling feeding line comprises a bridge at the center portion of the dual-polarized cross dipole for electrically isolating the first coupling feeding line from the second coupling feeding line.

There is further provided a system comprising two antenna systems according to any one or more of the examples outlined herein. The system further comprises a decoupling device, in particular a parasitic loop, extending generally in the second direction and arranged between the dual-polarized radiating element of the first antenna system and the dual-polarized radiating element of the second antenna system.

There is further provided a system comprising two antenna systems according to any one or more of the examples outlined herein (or the system as outlined above). The system further comprises one or more second radiating elements arranged, in relation to the second direction, at least partially between the reflector of the antenna system and the dual-polarized radiating element. The one or more second radiating elements are configured to emit electromagnetic waves having frequencies which are higher than a frequency of the electromagnetic wave emittable by the dual-polarized radiating element.

BRIEF DESCRIPTION OF THE DRAWINGS

These and other aspects of the invention will now be further described, by way of example only, with reference to the accompanying figures, wherein like reference numerals refer to like parts, and in which.

DETAILED DESCRIPTION

The present disclosure generally relates to a feeding of a radiating element from a side region (whereby the radiating element is fed at a feeding point at the center or center region of the radiating element), whereby a low-pass filter is provided in the feeding structure. Different structures of dipole antennas may be used in combination with the feeding network. Examples of the present disclosure may in particular be implemented in base station array antenna radiator elements.

According to example implementations of the present disclosure, in particular a wideband dual-polarized cross-dipole antenna may be fed from a side region via a feeding line coupled to a center portion of the dual-polarized cross-dipole antenna, which exhibits good performance for low-band and good suppression of high-band scattering in particular in multiband antenna arrays.

Throughout the present disclosure, low-band may refer to (but may not be limited to) frequencies in the range of 600 MHZ-960 MHZ, and high-band may refer to (but may not be limited to) frequencies in the range of 1700 MHZ-4200 MHZ.

In some example implementations, the feeding network comprises in particular a vertical oriented low-pass filter and a coupling feeding structure. It is, however, to be noted that the low-pass filter is not necessarily required for the feeding operation from a side region of the radiating element, but in particular when feeding from the side region of the radiating element, performance of the radiator may be improved and the impact on the high band radiator(s) may be reduced or removed based on the use of the low-pass filter.

The feeding of the center region of the radiating element from a region which comprises an end portion of the dual-polarized radiating element (whereby the feeding point is still in the center or center portion of the radiating element based on the coupling feeding line and the dipole arms of the radiating element being arranged on opposite sides of a substrate) enables in particular independence of an integrated advanced antenna system time division duplex system and higher flexibility for integrated antenna solutions. There are in particular no mechanical influences on the high-band antenna element modules.

In example implementations according to the present disclosure, the low-band antenna element volume is optimally utilized, resulting in improvement of the low-band antenna element bandwidth, while still being transparent to high-band antenna elements if present or not (for a modular range of use).

According to example implementations of the present disclosure, it is possible to implement additional antennas between the low-band radiating element and the reflector of the antenna system without a mechanical conflict with a feeding device positioned at the center of the (patch) antenna.

Figure 1A:
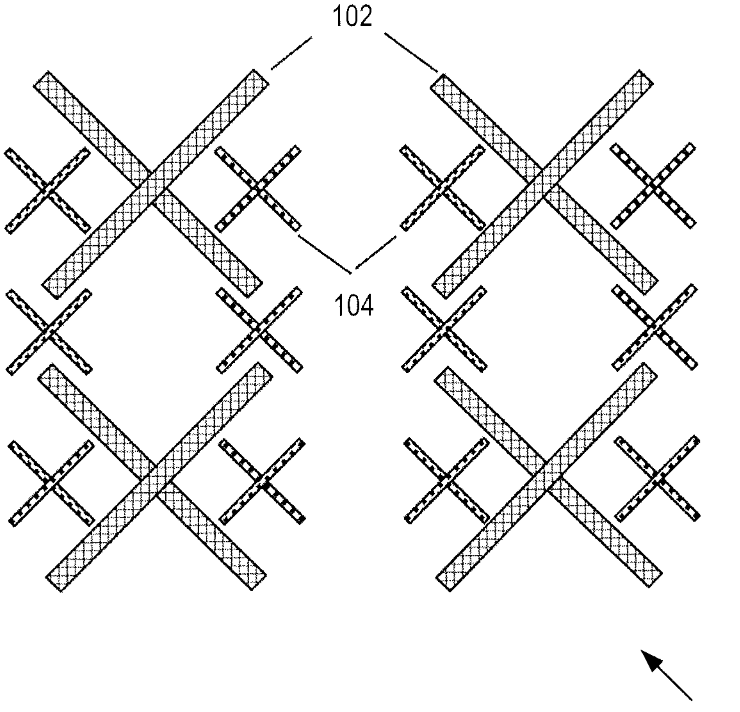
FIG. 1a (Prior art)
FIGS. 1*a* and *b* show top views of schematic illustrations of antenna systems according to the state of the art.
Figure 1B:
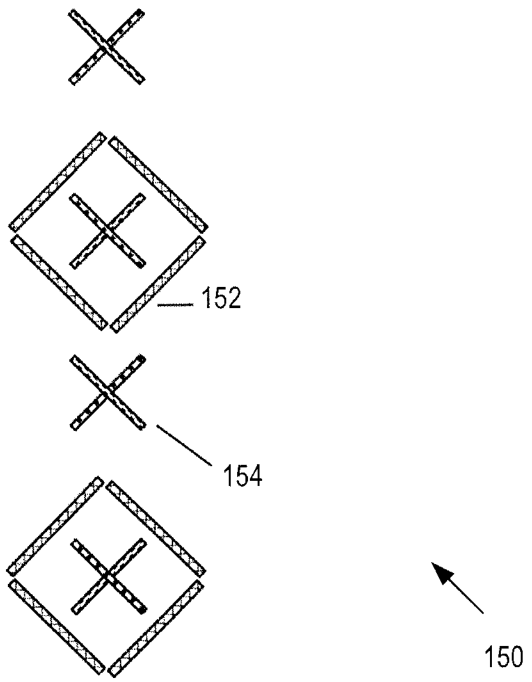
FIG. 1b (Prior art)
Figure 2A:
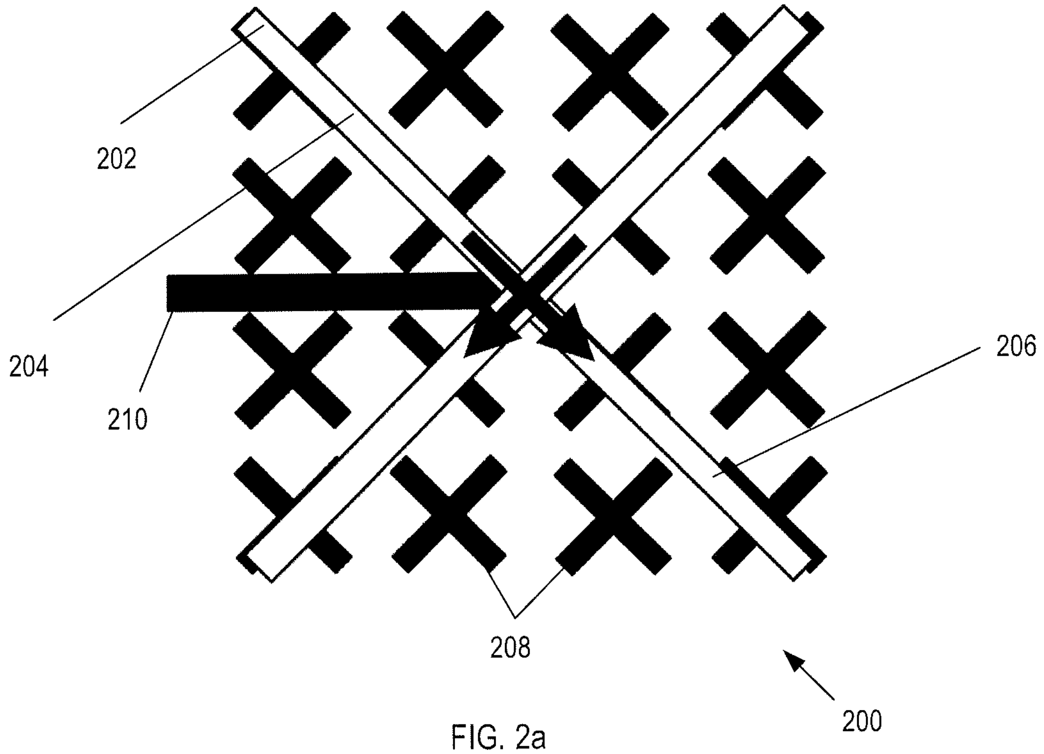
FIGS. 2*a* and *b* show a top view and a cross-sectional side view, respectively, of a schematic illustration of an antenna system of example implementations according to the present disclosure.
Figure 2B:
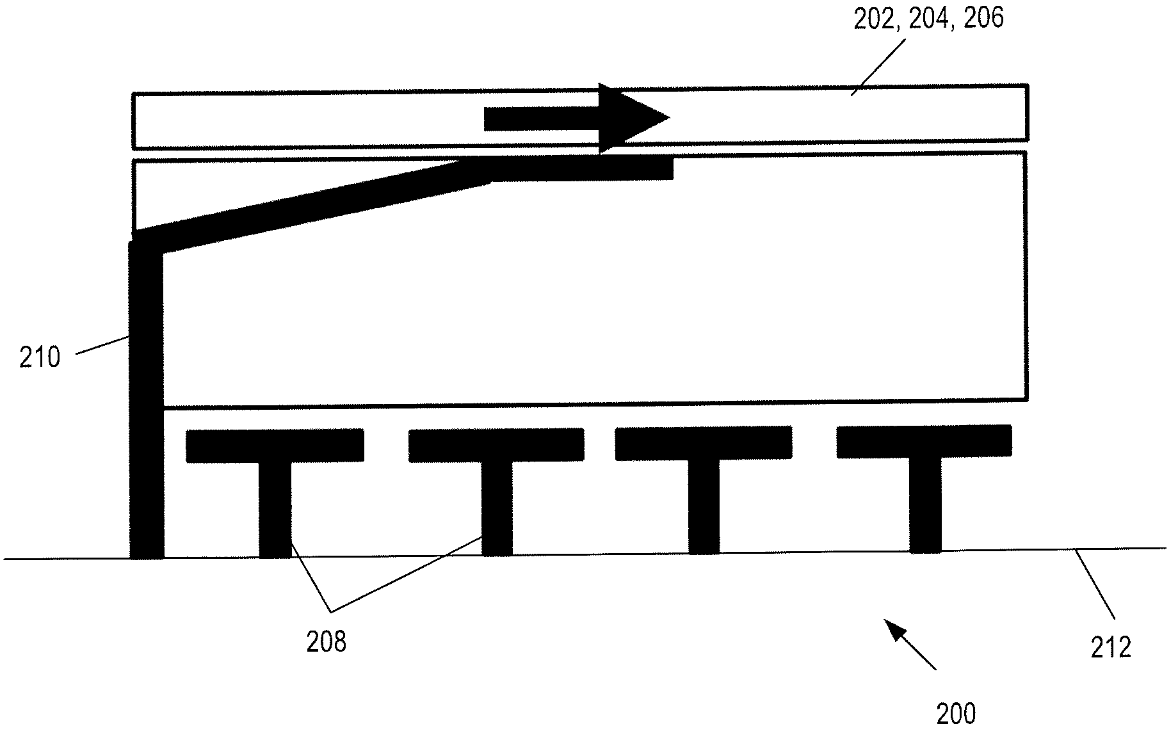

FIGS. 2*a* and *b* show a top view and a cross-sectional side view, respectively, of a schematic illustration of an antenna system 200 of example implementations according to the present disclosure.

In this example, the antenna system 200 comprises a radiating element 202 (e.g. low-band antenna element) with a first dipole arm 204 and a second dipole arm 206. Underneath the radiating element 202, high-band radiating elements 208 are arranged between the radiating element 202 and a reflector (shown later) of the antenna system 200.

A feeding coupling line 210 couples from a side region to the center portion of the radiating element 202. The coupling feeding line 210 extends, in this example, at an incline from the side region to the center portion of the radiating element 202. In some examples, when a PCB is used, preferably the feeding line 210 does not incline to the center portion/point of the radiator/radiating element 202, but it may instead be arranged in a plane parallel to the radiator/radiating element 202, as illustrated, for example, in FIG. 6*a* below.

A reflector 212 is provided in this example, on which the high-band radiating elements 208 and the radiating element 202 are arranged.

The volume below the low-band antenna element (radiating element 202) is utilized optimally without mechanical conflict for the high-band antenna element array (high-band radiating elements 208). High-band scattering is suppressed in view of the arrangement of the coupling feeding line 210 extending from the side region to the center portion of the radiating element 202.

FIGS. 3*a* to 3*e* show different views of schematic illustrations of an antenna system 300 and parts thereof of example implementations according to the present disclosure. A radiating element which is fed from a side region (whereby the feeding point of the radiator itself is, as outlined above, at the center or center region of the radiating element) is illustrated. A quasi-open-sleeve dipole may be used, in these examples, without chokes in the radiating element.

Figure 3A:
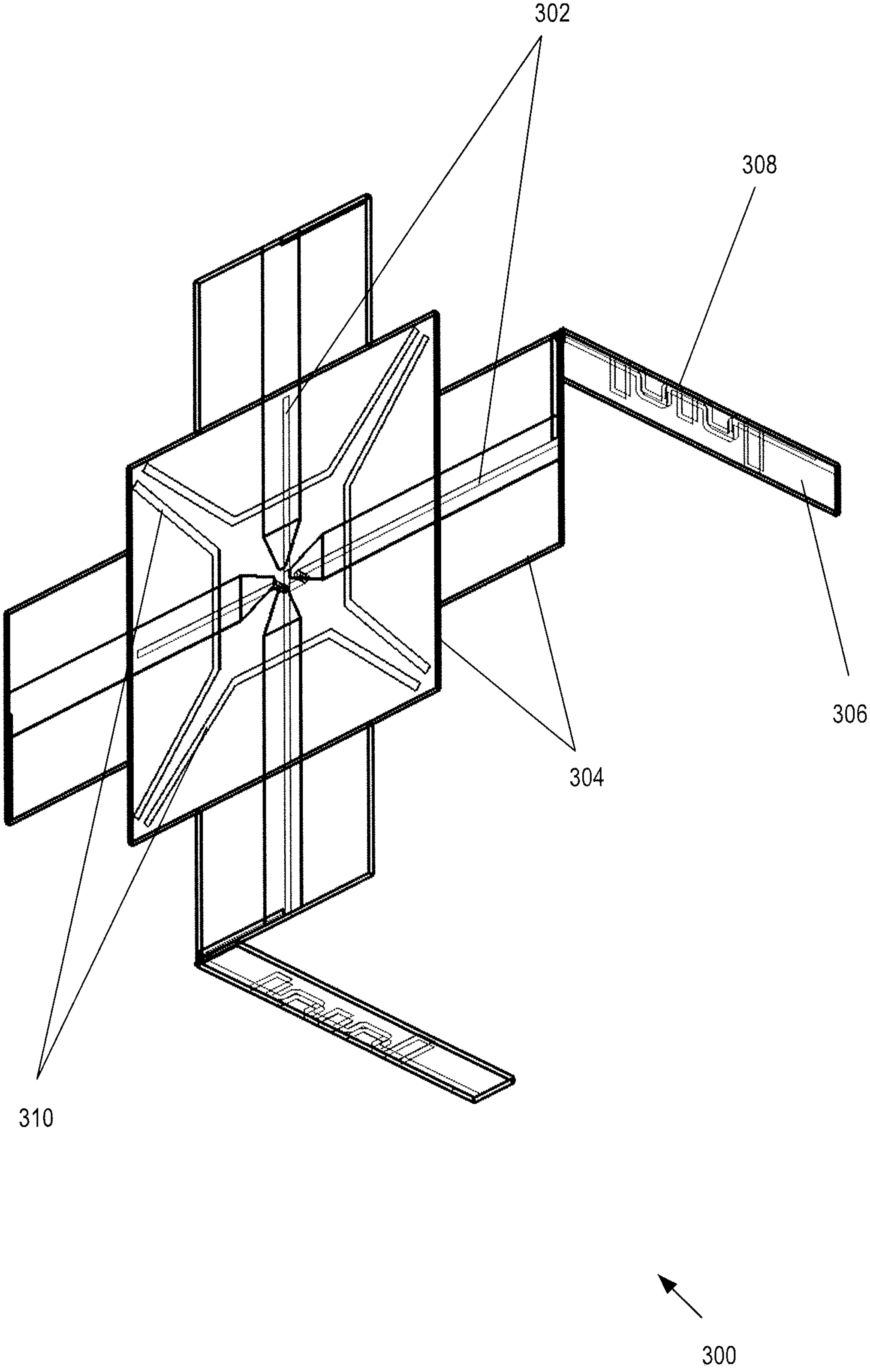
FIGS. 3*a* to 3*e* show different views of schematic illustrations of an antenna system and parts thereof of example implementations according to the present disclosure.

In this example, as can be seen in the perspective bottom view of FIG. 3*a*, the antenna system 300 comprises coupling feeding lines 302 which are provided on the bottom side of the dielectric substrate 304. A further substrate 306 is provided, on which a low-pass filter structure 308 is arranged (oriented generally vertically with respect to the direction of the coupling feeding lines 302 and/or to the reflector 212). In this example, a first low-pass filter structure 308 is electrically coupled to a first dipole arm of the dual-polarized cross dipole, and a second low-pass filter structure 308 is electrically coupled to a second dipole arm of the dual-polarized cross dipole.

In this example, conductive parasitic elements 310 are provided on the dielectric substrate 304. The conductive parasitic elements 310 are electrically disconnected from the coupling feeding lines 302. The conductive parasitic elements 310 are used in order to influence the radiation pattern of the dual-polarized cross dipole. Using conductive parasitic elements 310 may improve symmetry and cross-polar behavior of the antenna.

The low-pass filter structure 308 is provided, in this example, by using a parallel stripline, and is used for feeding the cross-dipole radiator without installing any extra balun. In this example, the top strip conductor of the low-pass filter structure connects the feeding port directly with one of the dipole arms, while its bottom strip conductor is connected with the coupling feeding structure (coupling feeding line 302).

Figure 3B:
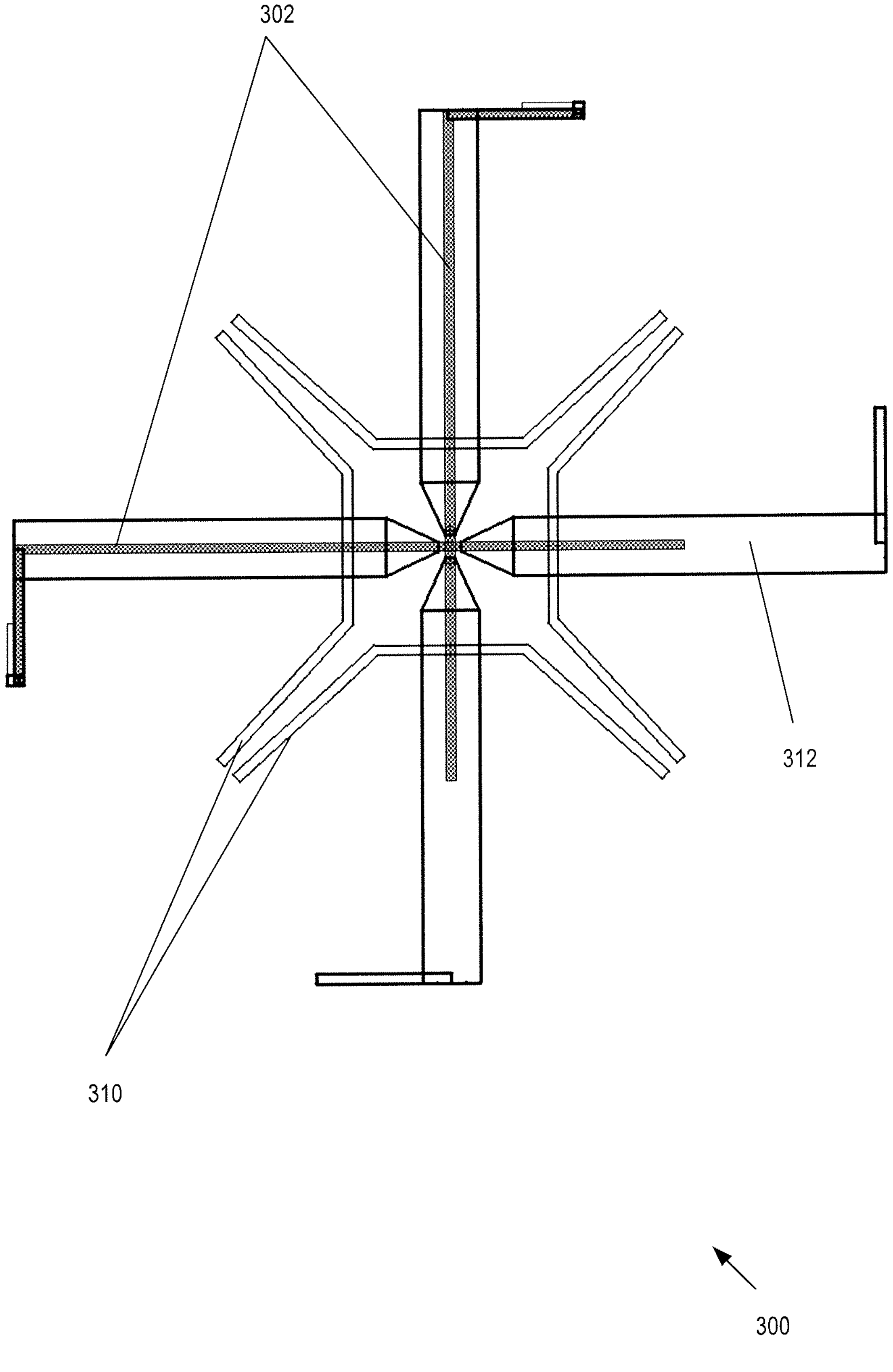

FIG. 3*b* shows a top view of the low-band single antenna element depicted in FIG. 3*a*. The coupling feeding lines 302 are printed on the bottom of the substrate and are shown in the top view of FIG. 3*b* for illustration purposes only. In this example, as can be seen, the coupling feeding lines 302 are open on respective dipole arms 312 for impedance adjustment.

Figure 3C:
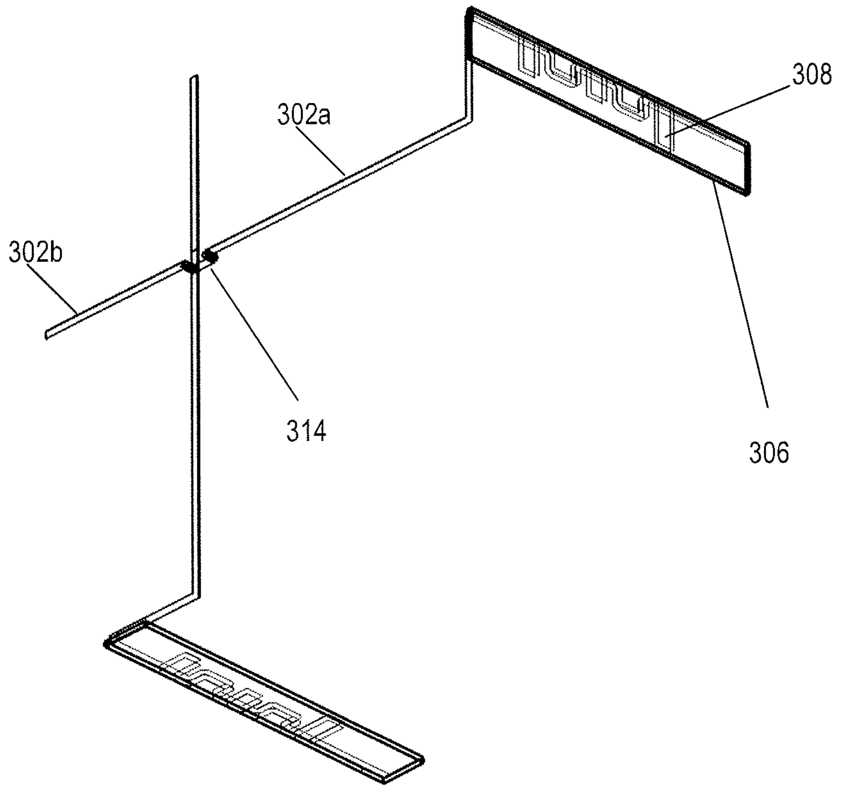
Figure 3D:
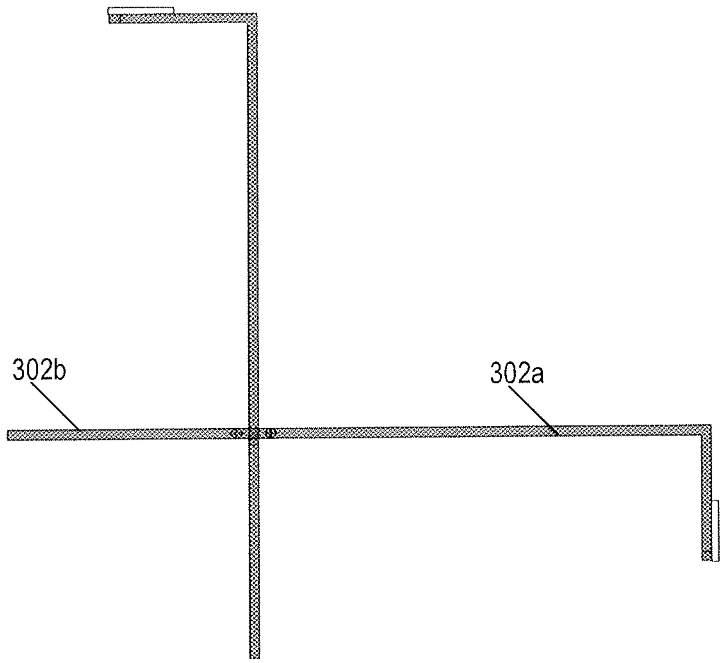

Only some components of the antenna system 300 are depicted in FIGS. 3*c* and *d*, which show the feeding network consisting of the coupling feeding structure and the low-pass filter structure which are ultimately printed on a (dielectric) substrate. As can be seen in FIG. 3*c*, a bridge 314 (in some examples in the form of metal columns) is provided in order to isolate the two ports for the respective dipole arms from each other. Each of the coupling feeding lines 302 is comprised of a transmission line 302*a* and a tuning stub 302*b*. The tuning stubs 302*b* may generally be used as capacitors, inductors and resonant circuits in the antenna system.

Figure 3E:
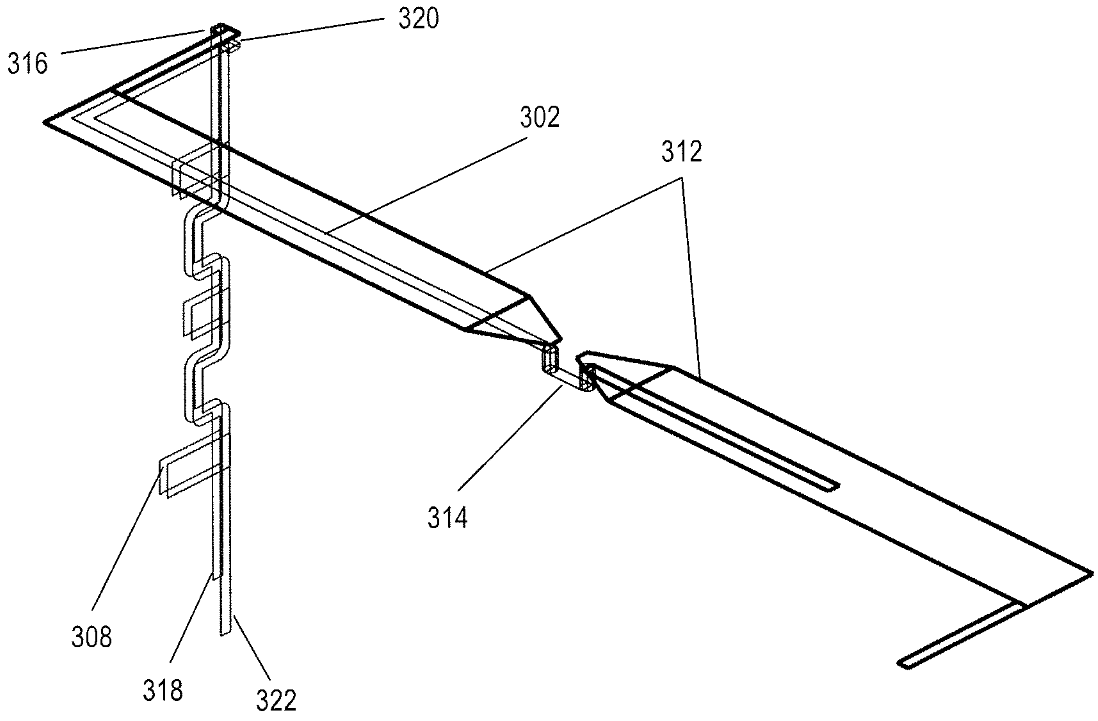

FIG. 3*e* depicts details of the couplings of the low-pass filter, whereby substrate layers are omitted for clarity. In this example, the low-pass filter comprises an outer/top layer strip conductor 316 coupling which couples the low-pass filter to a dipole arm. The low-pass filter outer/top layer is connected, in this example, to the feeding port 318. Furthermore, in this example, the low-pass filter comprises an inner/bottom layer strip conductor 320 coupling which couples the low-pass filter to the coupling feeding line. The low-pass filter inner/bottom layer is coupled, in this example, at the coupling 322 to the reflector or ground. The coupling feeding lines are arranged on the bottom layer/side and the dipole arms are arranged on the top layer/side of the (dielectric) substrate.

Figure 4:
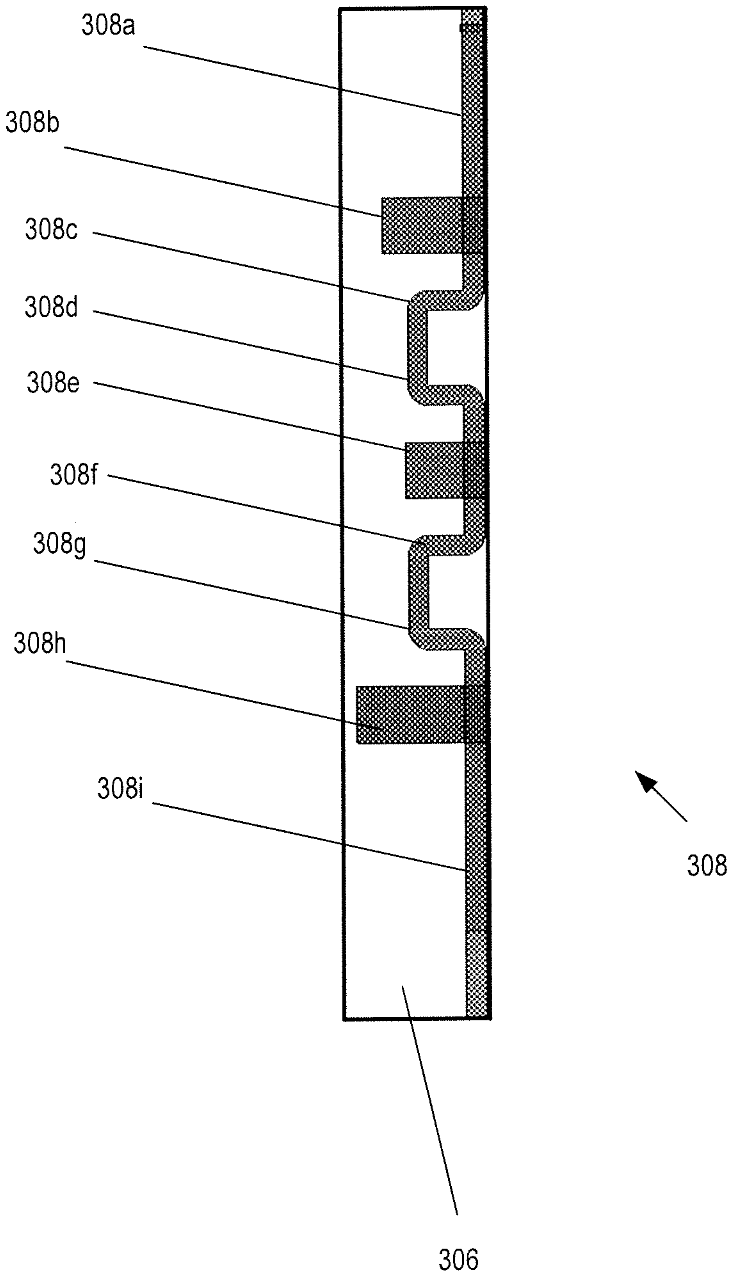
FIG. 4 shows a schematic illustration of a low-pass filter structure of example implementations according to the present disclosure.

FIG. 4 shows a schematic illustration of a low-pass filter structure 308 of example implementations according to the present disclosure.

In this example, the metallization layers of one of the low-pass filter structures printed on a substrate 306 are illustrated. The low-pass filter structure in this example uses a stepped impedance method employing cascaded inductance and capacitance elements (L-C-L) 308*a-i*, printed on the dielectric substrate 306. In this example, the low-pass filter structure 308 comprises an inductance element 308*a*, a capacitance element 308*b*, an inductance element 308*c*, an inductance element 308*d*, a capacitance element 308*e*, an inductance element 308*f*, an inductance element 308*g*, a capacitive element 308*h*, and an inductance element 308*i*. As will be appreciated, other configurations of the low-pass filter structure may be implemented. The low-pass filter in this example uses a meander line structure, but alternative structures may be exploited.

Figure 5A:
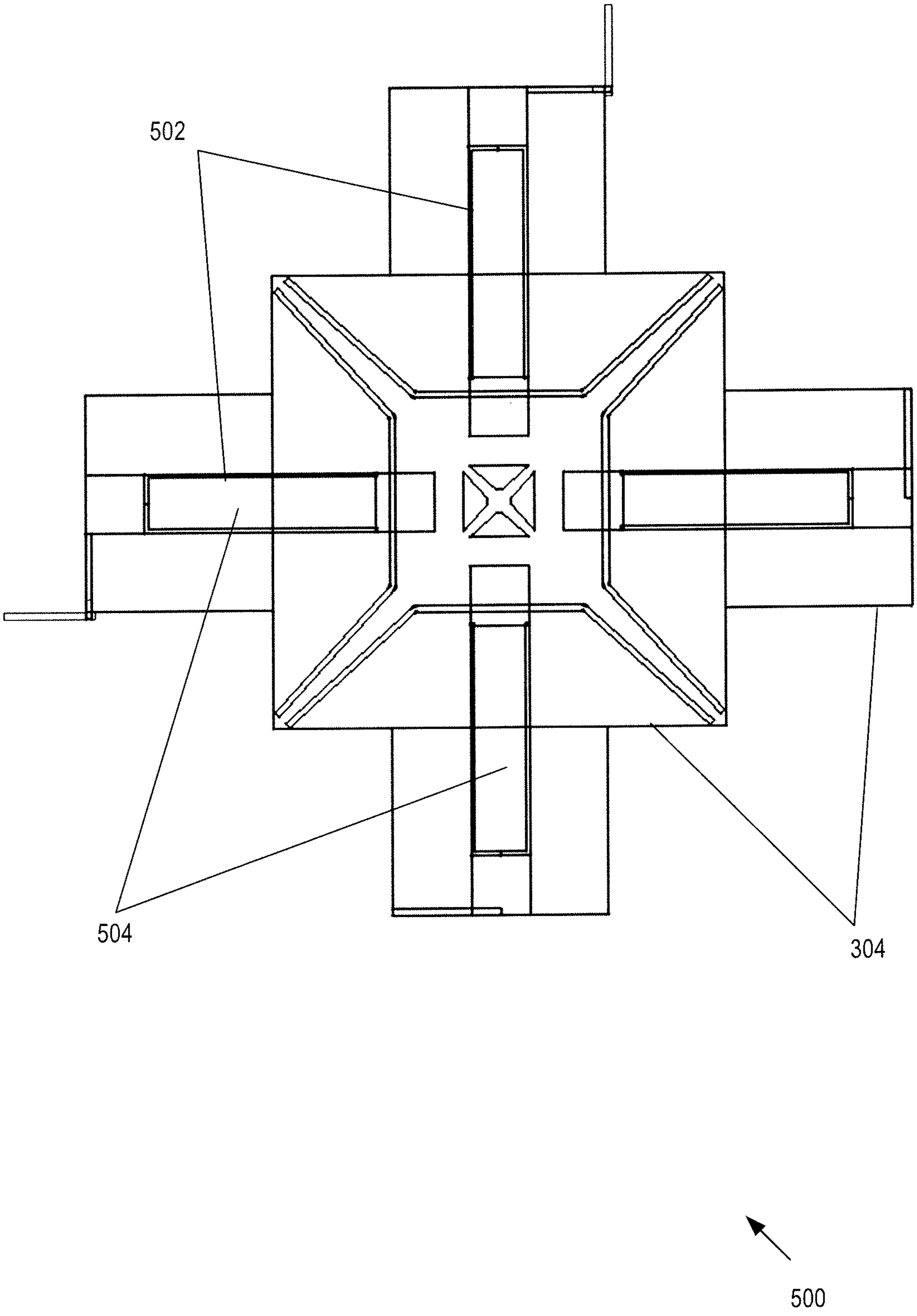
FIGS. 5*a* and *b* show schematic illustrations of an antenna system and parts thereof of example implementations according to the present disclosure.

FIGS. 5*a* and *b* show schematic illustrations of an antenna system 500 and parts thereof of example implementations according to the present disclosure. A quasi-open-sleeve dipole may be used, in these examples, with chokes 502 in the radiating element.

In this example, as can be seen in the top view depicted in FIG. 5*a*, the dipole arms (which may be the low-band dipole arms) comprise (radio-frequency) chokes 502 which may be resonant at high band frequencies in order to minimize scattering of high-band elements. The cutout 504 of a part of the low-band radiating metal area may also minimize undesired scattering of the high-band radiation caused by the low-band radiator.

Figure 5B:
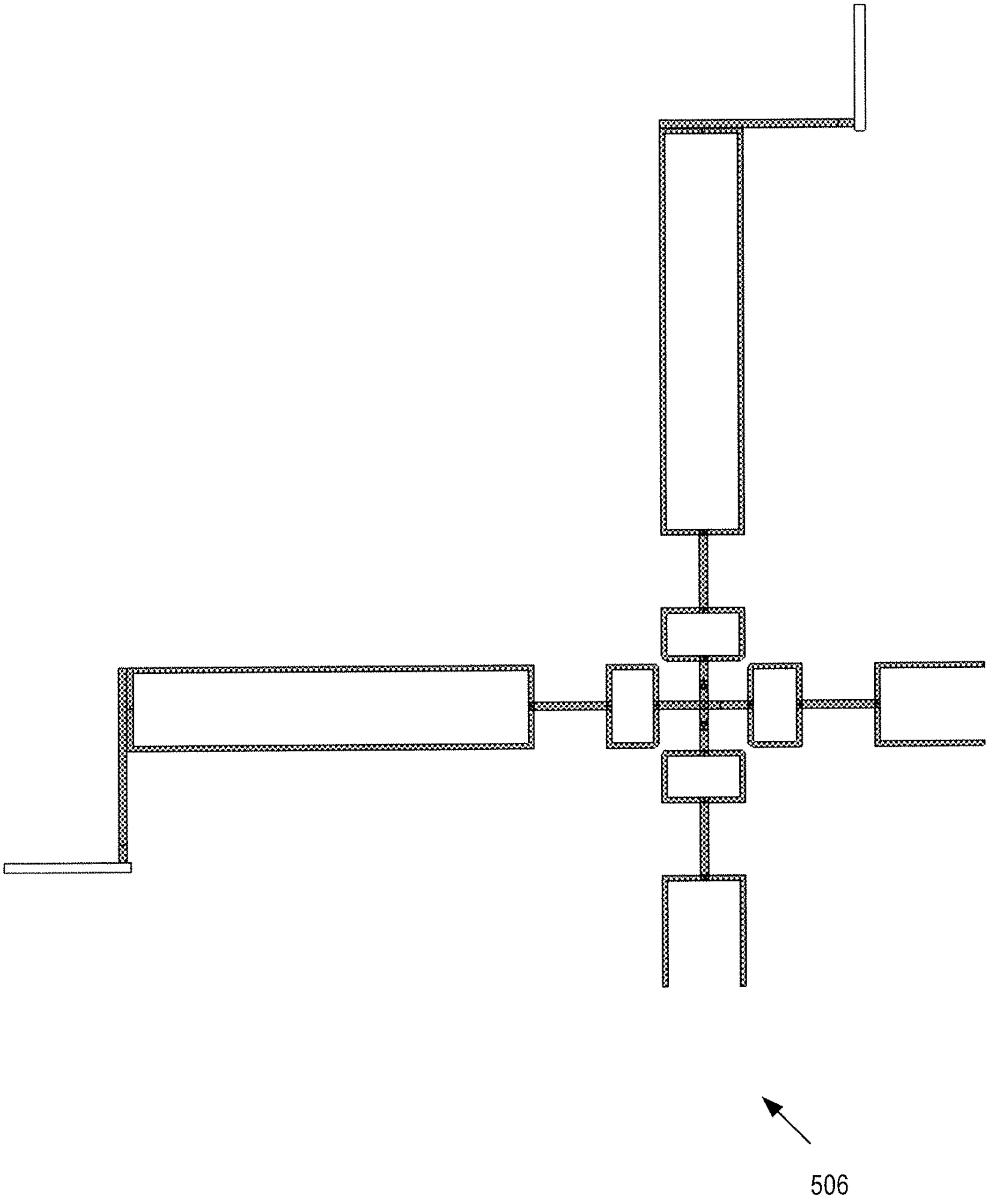

In FIG. 5*b*, the coupling feeding line structure 506 which is printed on the bottom of the dielectric substrate 304 is shown. Various cutouts and chokes are provided. It is to be noted that a bridge is also provided in this example in the center in order to isolate the two ports for the respective dipole arms from each other.

Figure 6A:
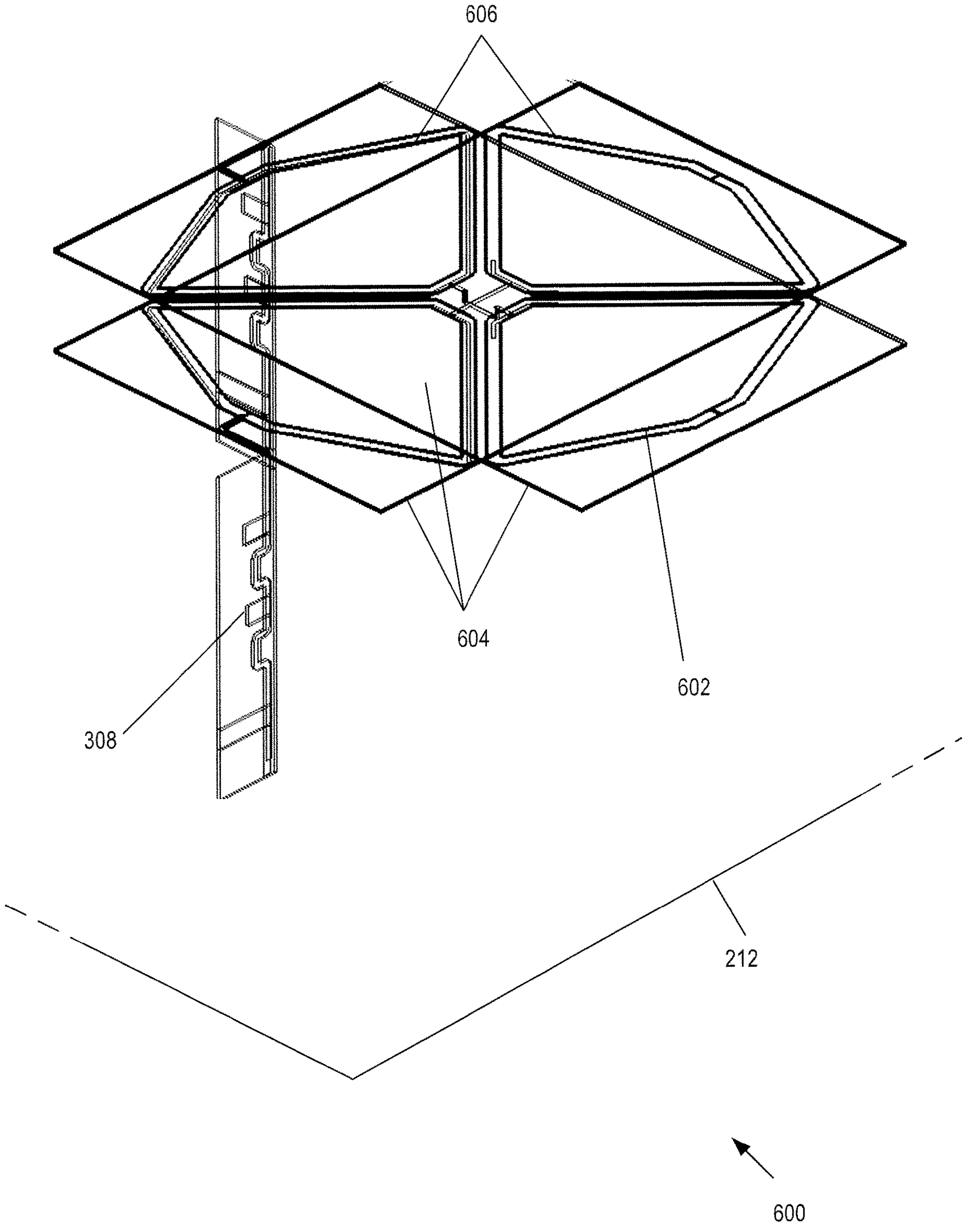
FIGS. 6*a* to *d* show different views of schematic illustrations of an antenna system and parts thereof of example implementations according to the present disclosure.
Figure 6B:
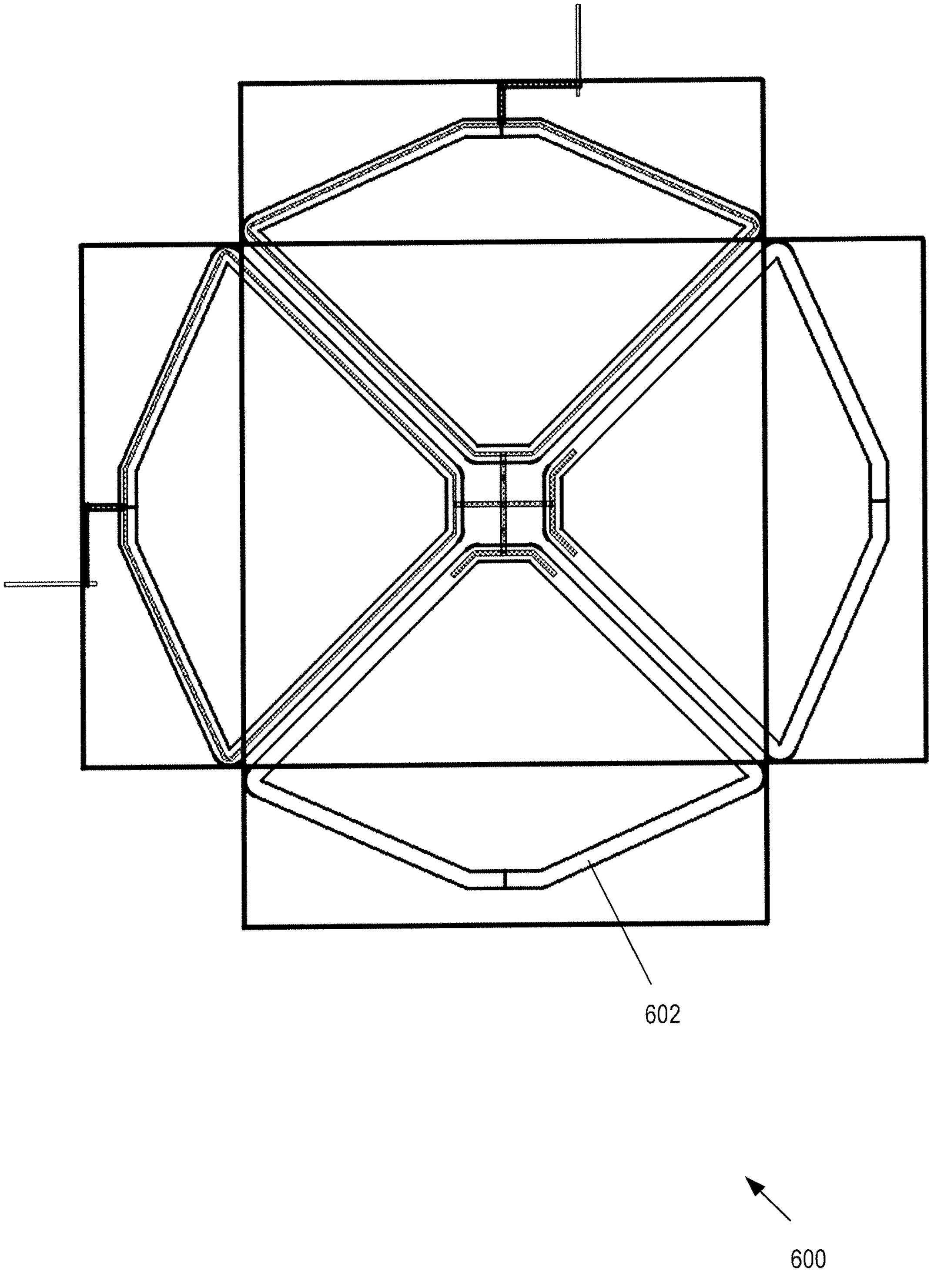
Figure 6C:
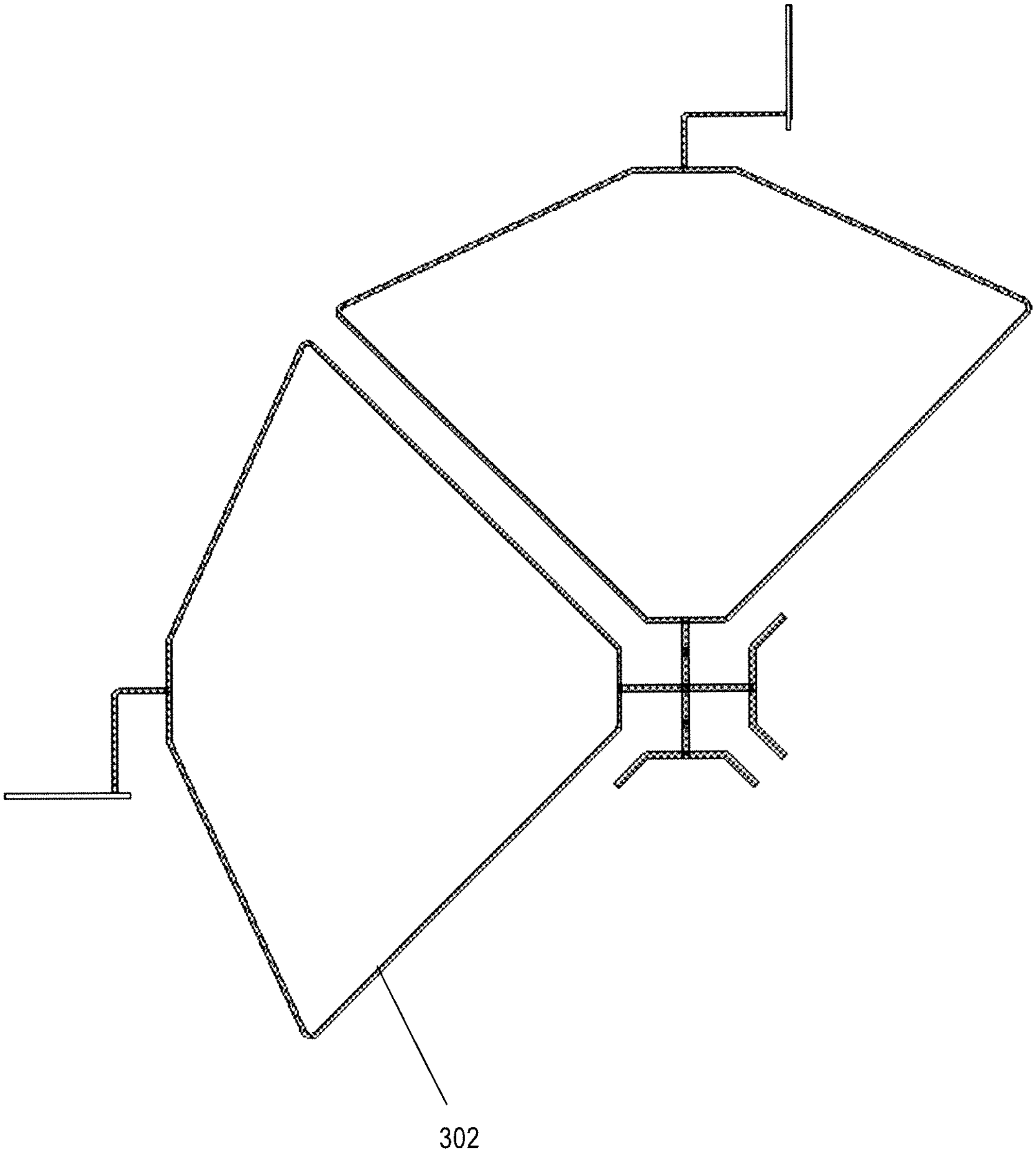

FIGS. 6*a* to *c* show different views of schematic illustrations of an antenna system 600 and parts thereof of example implementations according to the present disclosure.

In this example, the radiating element 602, which is arranged on dielectric substrate 604, comprises loop dipole arms 606. The loop-shaped dipole arms may be comprised in a low-band cross-dipole.

In some examples, the coupling at the center portion of the cross-dipole is galvanic. Alternatively, the coupling may be capacitive, which may result in a larger bandwidth.

It is to be noted that a bridge is also provided in this example in the center in order to isolate the ports for the respective loop dipole arms 606 from each other.

The low-pass filter structure 308 for feeding the loop dipole arms 606 is depicted.

FIG. 6*b* shows a top view of the elements depicted in FIG. 6*a*. FIG. 6*c* shows the coupling feeding lines 302 which are printed on the bottom of the substrate, while, again, the radiating element 602 (loop dipole arms 606) is (are) arranged on the top of the substrate.

Figure 6D:
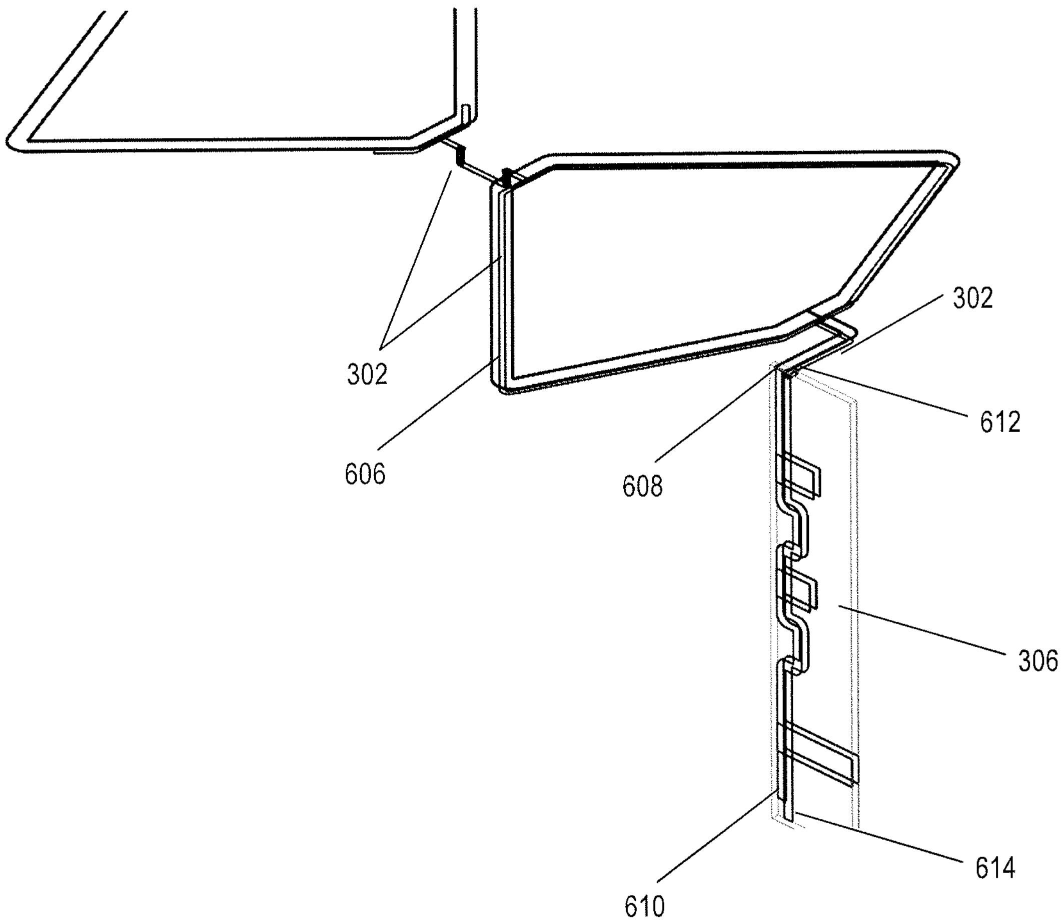

FIG. 6*d* depicts details of the couplings of the low-pass filter, whereby substrate layers are omitted for clarity. In this example, the low-pass filter comprises an outer/top layer strip conductor 608 coupling which couples the low-pass filter to a dipole arm. The low-pass filter outer/top layer is connected, in this example, to the feeding port 610. Furthermore, in this example, the low-pass filter comprises an inner/bottom layer strip conductor 612 coupling which couples the low-pass filter to the coupling feeding line. The low-pass filter inner/bottom layer is coupled, in this example, at the coupling 614 to the reflector or ground. The coupling feeding lines are arranged on the bottom layer/side and the dipole arms are arranged on the top layer/side of the (dielectric) substrate. In this example, couplings of the low-pass filter outer/top layer to the dipole arm and to the coupling feeding line, respectively, are galvanic couplings. The low-pass filter dielectric substrate is arranged between the low-pass filter top layer and the low-pass filter bottom layer.

In this example, using loop dipole arms 606, a higher port-to-port isolation, stable gain and radiation patterns with improved symmetry relative to the boresight of the antenna may be achieved. While, in this example, cross-dipoles and, when implemented, parasitic elements are printed on the same side of the substrate, the coupling feeding lines are printed on the opposite substrate side.

Figure 7:
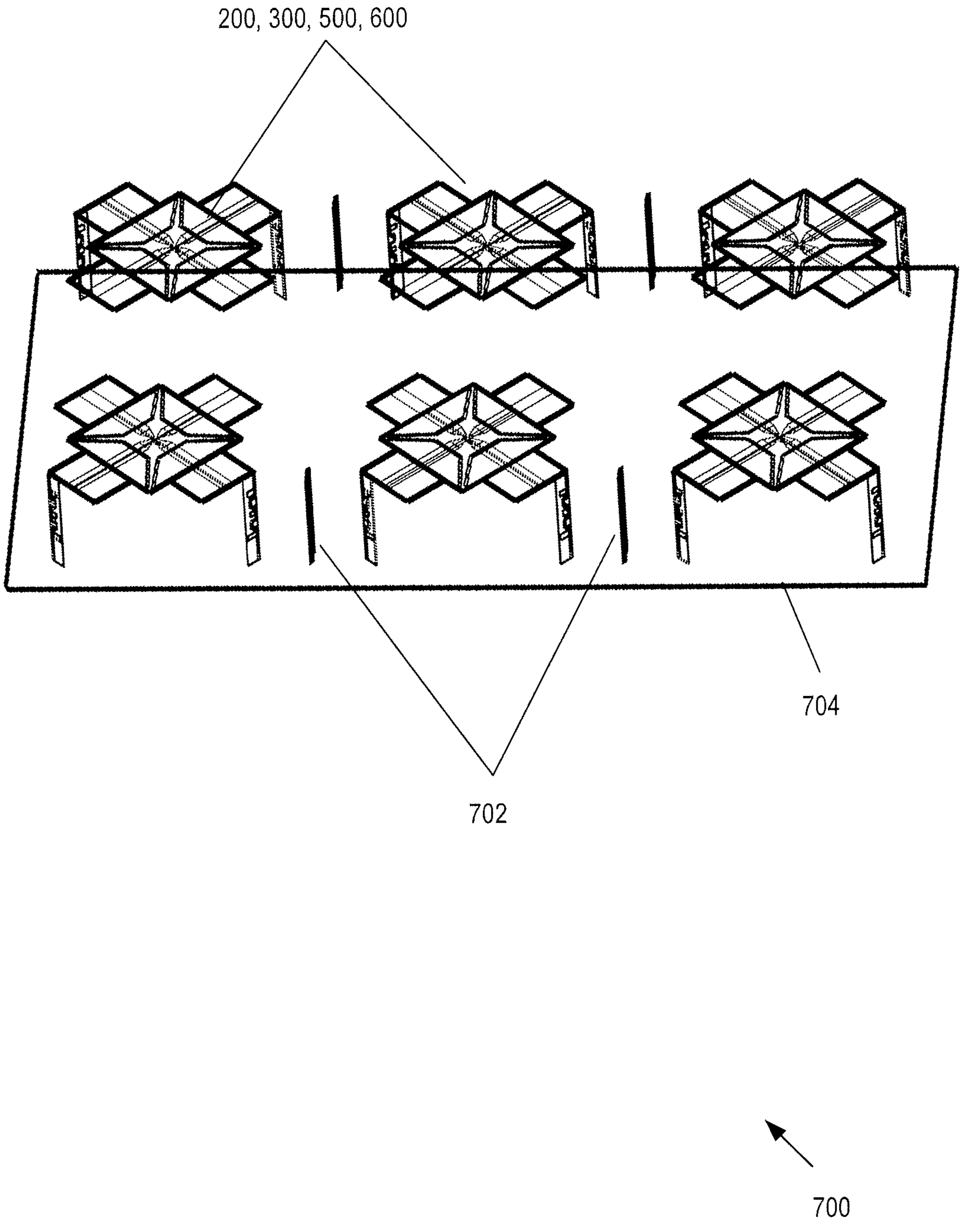
FIG. 7 shows a perspective view of a schematic illustration of a system of example implementations according to the present disclosure.

FIG. 7 shows a perspective view of a schematic illustration of a system 700 of example implementations according to the present disclosure. The system 700 may be comprised in a base station low-band array.

In this example, the system 700 comprises antenna systems 200, 300, 500, 600 (e.g. low-band radiators) which are shielded from each other using decoupling devices 702. The decoupling devices 702 may be parasitic loops for port isolation. The elements are arranged on a reflector 704 of the system 700.

Figure 8A:
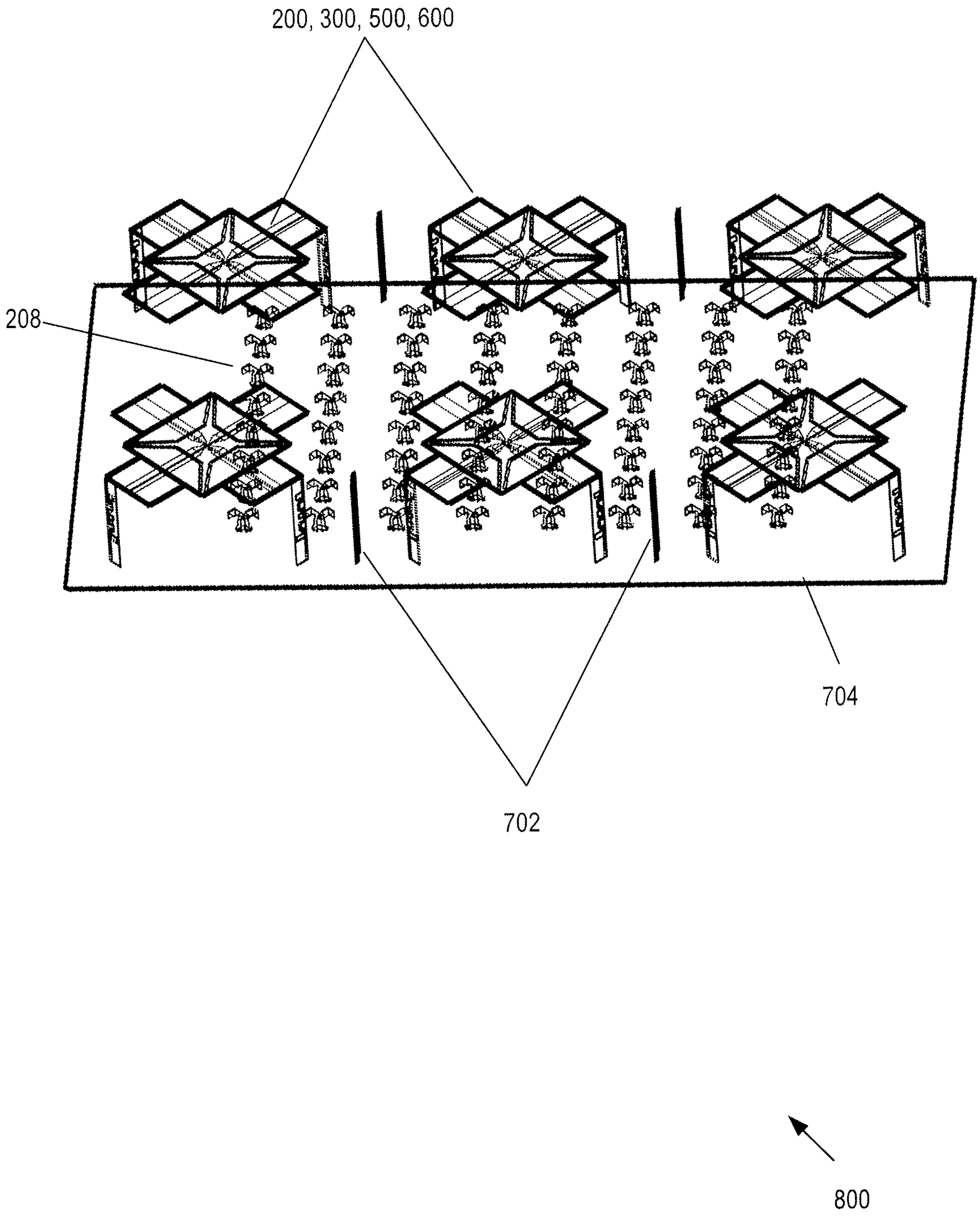
FIGS. 8*a* and *b* show different views of a schematic illustration of a system of example implementations according to the present disclosure.
Figure 8B:
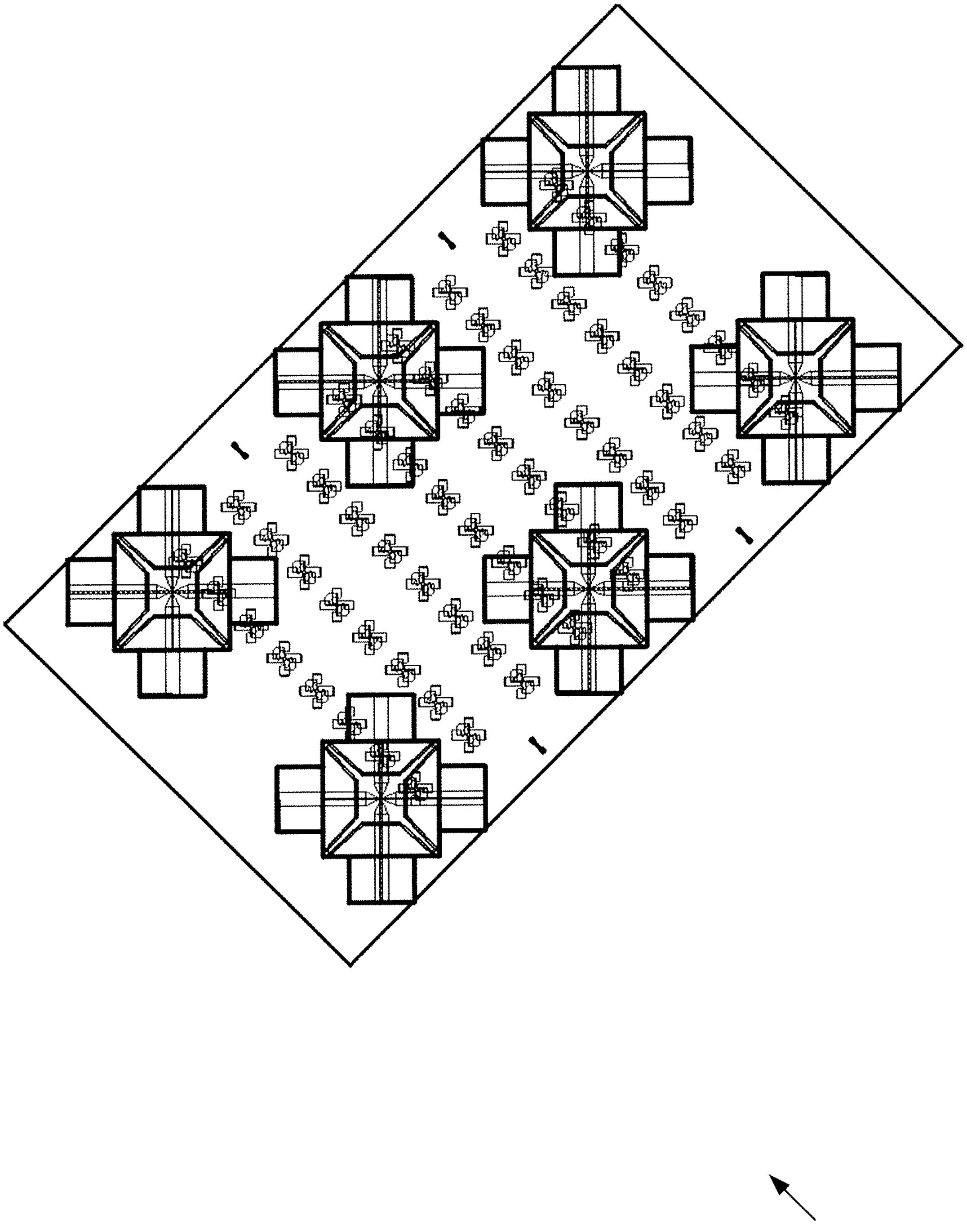

FIGS. 8*a* and *b* show perspective and top views, respectively, of a schematic illustration of a system 800 of example implementations according to the present disclosure. The system 800 may be comprised in a base station antenna with low-band and high-band radiators.

In this example, in addition to the elements shown in FIG. 7, the system 800 further comprises second radiating elements 208, which may be high-band radiating elements emitting electromagnetic waves having frequencies higher than the frequencies of electromagnetic waves emitted by the low-band radiating elements of antenna systems 200, 300, 500, 600.

In this example, the dual-band antenna implements examples of the present disclosure, in particular the feeding via low-pass filter structures from a side region to a center portion of the radiating elements (with the feeding point being in the center portion of the radiating elements). In this example, there is a 2×3 array of low-band elements including side-region feeding networks, and an 8×8 array of high-band elements. As will be appreciated, other configurations and numbers of elements in the arrays are possible.

Examples of the present disclosure may be implemented in particular in base station antennas. A combination of active and passive antenna equipment may be provided. A standardized module concept may be implemented for different platform variants, thereby simplifying the production concept.

In some examples according to the present disclosure, the principle of operation is based on impedance matching and the bandwidth of the low-band antenna elements having been achieved by introducing feeding lines and pairs of orthogonal planar dipoles. Furthermore, a low-pass filter, for example a stepped-impedance low-pass filter, may be employed in order to suppress the higher-order harmonic band of radiation further.

Coupling feeding lines are introduced to control the coupling with the antenna to achieve broadband and good impedance matching. In some examples, wide impedance bandwidth can be achieved by adjusting the width of the transmission line and/or the length of the tuning stub.

A low-pass filter structure is used when feeding of the dipoles, instead of using, e.g., a quarter-wave transformer or a balun etc. Thus, this low-pass filter structure brings out no extra length in the entire antenna, but it can suppress the high-order harmonic band as desired.

A wideband and good dual-polarization characteristics of the low-band antenna elements are achieved, in some examples, by orthogonally placing two pairs of planar quasi-open-sleeve dipoles or simply by using loop dipoles.

To achieve higher isolation between adjacent ports of neighboring low-band antenna elements, vertical extended parasitic loops are placed, in some examples, between neighboring low-band antenna elements.

No doubt many other effective alternatives will occur to the skilled person. It will be understood that the invention is not limited to the described embodiments and encompasses modifications apparent to those skilled in the art and lying within the scope of the claims append portioned hereto.

The invention claimed is:

1. An antenna system comprising:

a dual-polarized radiating element extending generally in a first direction parallel or substantially parallel to a reflector of the antenna system, wherein the dual-polarized radiating element is configured to emit an electromagnetic wave;

a low-pass filter structure extending generally in a second direction perpendicular or substantially perpendicular to the reflector of the antenna system, wherein the low-pass filter structure is spaced apart, in relation to the first direction, from a center portion of the dual-polarized radiating element, wherein the low-pass filter structure comprises a stepped-impedance low-pass filter structure comprising an L-C-L filter; and a coupling feeding line which electrically couples, via a region which comprises an end portion of the dual-polarized radiating element, the low-pass filter structure with the center portion of the dual-polarized radiating element for feeding an electrical signal via the low-pass filter structure through the coupling feeding line to the center portion of the dual-polarized radiating element.

2. An antenna system as claimed in claim 1, wherein the low-pass filter structure comprises or is coupled to a first strip conductor and a second strip conductor, wherein the first strip conductor couples a feeding port of the antenna system with the dual-polarized radiating element, and wherein the second strip conductor is coupled to the coupling feeding line.

3. An antenna system as claimed in claim 1, further comprising a dielectric substrate extending generally parallel or substantially parallel to the reflector of the antenna system, wherein the dual-polarized radiating element is arranged at least partially on a first side of the dielectric substrate, and wherein the coupling feeding line is arranged at least partially on a second side of the dielectric substrate, wherein the first side is opposite to the second side, wherein the first side faces away from the reflector of the antenna system, and wherein the second side faces towards the reflector of the antenna system.

4. An antenna system as claimed in claim 3, wherein the coupling feeding line extends at least from an end portion of the dielectric substrate to the center portion of the dual-polarized radiating element.

5. An antenna system as claimed in claim 4, wherein the coupling feeding line extends from the end portion of the dielectric substrate beyond the center portion of the dual-polarized radiating element.

6. An antenna system as claimed in claim 1, wherein the coupling feeding line at least partially extends parallel or substantially parallel to the first direction.

7. An antenna system as claimed in claim 1, wherein a coupling between the coupling feeding line and the center portion of the dual-polarized radiating element is capacitive or galvanic.

8. An antenna system as claimed in claim 1, wherein the low-pass filter structure comprises a corrugated structure.

9. An antenna system as claimed in claim 1, wherein the low-pass filter structure is arranged at an end portion of the dual-polarized radiating element.

10. An antenna system as claimed in claim 1, further comprising one or more chokes provided in the dual-polarized radiating element.

11. An antenna system as claimed in claim 1, wherein the dual-polarized radiating element comprises one or more loop dipole arms.

12. An antenna system as claimed in claim 1, further comprising one or more conductive parasitic elements electrically disconnected from the coupling feeding line.

13. An antenna system as claimed in claim 1, wherein the coupling feeding line comprises a corrugated structure.

14. An antenna system as claimed in claim 1, wherein the dual-polarized radiating element comprises a dual-polarized cross dipole comprising two dipole arms which are arranged orthogonal with respect to each other, wherein the two dipole arms extend generally in a plane parallel or substantially parallel to the reflector of the antenna system, wherein the antenna system comprises two said low-pass filter structures, wherein a first one of the low-pass filter structures is electrically coupled with the center portion of the dual-polarized cross dipole via a first coupling feeding line for feeding a first electrical signal to a first one of the dipole arms, and wherein a second one of the low-pass filter structures is electrically coupled with the center portion of the dual-polarized cross dipole via a second coupling feeding line for feeding a second electrical signal to a second one of the dipole arms.

15. An antenna system as claimed in claim 14, wherein the first low-pass filter structure is arranged at an end portion of the first dipole arm, and wherein the second low-pass filter structure is arranged at an end portion of the second dipole arm.

16. An antenna system as claimed in claim 15, wherein the first coupling feeding line and the second coupling feeding line are arranged at least partially on a second side of a dielectric substrate, and wherein the first coupling feeding line comprises a bridge at the center portion of the dual-polarized cross dipole for electrically isolating the first coupling feeding line from the second coupling feeding line.

17. A system comprising:

two antenna systems comprising:

a first antenna system comprising:

a first dual-polarized radiating element extending generally in a first direction parallel or substantially parallel to a first reflector of the first antenna system, wherein the first dual-polarized radiating element is configured to emit an electromagnetic wave;

a first low-pass filter structure extending generally in a second direction perpendicular or substantially perpendicular to the first reflector of the first antenna system, wherein the first low-pass filter structure is spaced apart, in relation to the first direction, from a center portion of the first dual-polarized radiating element; and a first coupling feeding line which electrically couples, via a region which comprises an end portion of the first dual-polarized radiating element, the first low-pass filter structure with the center portion of the first dual-polarized radiating element for feeding an electrical signal via the first low-pass filter structure through the first coupling feeding line to the center portion of the first dual-polarized radiating element; and a second antenna system comprising:

a second dual-polarized radiating element extending generally in the first direction parallel or substantially parallel to a second reflector of the second antenna system, wherein the second dual-polarized radiating element is configured to emit an electromagnetic wave;

a second low-pass filter structure extending generally in the second direction perpendicular or substantially perpendicular to the second reflector of the second antenna system, wherein the second low-pass filter structure is spaced apart, in relation to the first direction, from a center portion of the second dual-polarized radiating element, wherein the first low-pass filter structure and the second low-pass filter structure comprise a stepped-impedance low-pass filter structure comprising an L-C-L filter; and a second coupling feeding line which electrically couples, via a region which comprises an end portion of the second dual-polarized radiating element, the second low-pass filter structure with the center portion of the second dual-polarized radiating element for feeding another electrical signal via the second low-pass filter structure through the second coupling feeding line to the center portion of the second dual-polarized radiating element; and a decoupling device, in particular a parasitic loop, extending generally in the second direction and arranged between the first dual-polarized radiating element of the first antenna system and the second dual-polarized radiating element of the second antenna system.

18. A system comprising:

two antenna systems comprising:

a first antenna system comprising:

a first dual-polarized radiating element extending generally in a first direction parallel or substantially parallel to a reflector of the first antenna system, wherein the first dual-polarized radiating element is configured to emit an electromagnetic wave;

a first low-pass filter structure extending generally in a second direction perpendicular or substantially perpendicular to the reflector of the first antenna system, wherein the first low-pass filter structure is spaced apart, in relation to the first direction, from a center portion of the first dual-polarized radiating element; and a first coupling feeding line which electrically couples, via a region which comprises an end portion of the first dual-polarized radiating element, the first low-pass filter structure with the center portion of the first dual-polarized radiating element for feeding an electrical signal via the first low-pass filter structure through the first coupling feeding line to the center portion of the first dual-polarized radiating element; and a second antenna system comprising:

a second dual-polarized radiating element extending generally in the first direction parallel or substantially parallel to a reflector of the second antenna system, wherein the second dual-polarized radiating element is configured to emit an electromagnetic wave;

a second low-pass filter structure extending generally in the second direction perpendicular or substantially perpendicular to the reflector of the second antenna system, wherein the second low-pass filter structure is spaced apart, in relation to the first direction, from a center portion of the second dual-polarized radiating element, wherein the first low-pass filter structure and the second low-pass filter structure comprise a stepped-impedance low-pass filter structure comprising an L-C-L filter; and a second coupling feeding line which electrically couples, via a region which comprises an end portion of the second dual-polarized radiating element, the second low-pass filter structure with the center portion of the second dual-polarized radiating element for feeding another electrical signal via the second low-pass filter structure through the second coupling feeding line to the center portion of the second dual-polarized radiating element; and one or more additional second dual-polarized radiating elements arranged, in relation to the second direction, at least partially between the reflector of the first antenna system and the reflector of the second antenna system and the second dual-polarized radiating element, wherein the one or more additional second dual-polarized radiating elements are configured to emit electromagnetic waves having frequencies which are higher than a frequency of the electromagnetic wave emittable by the dual-polarized radiating element.

* * * * *